May 18, 1937. R. B. HITCHCOCK 2,080,717
CORN HUSKER
Original Filed April 20, 1933 2 Sheets-Sheet 1

Inventor
Rex B. Hitchcock
By ... Atty.

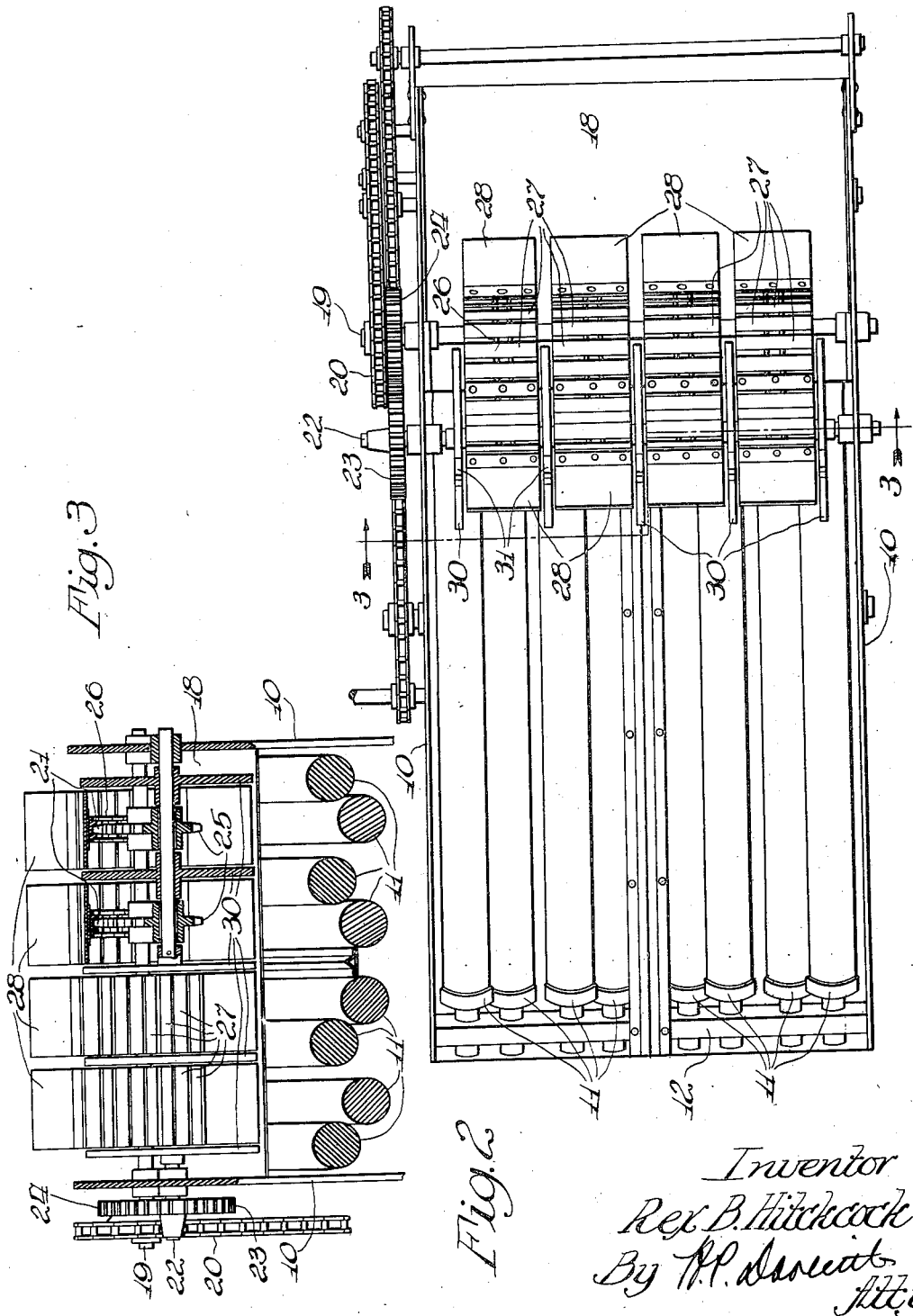

Patented May 18, 1937

2,080,717

UNITED STATES PATENT OFFICE 2,080,717

CORN HUSKER

Rex B. Hitchcock, Marcq-en-Baroeul, France, assignor to International Harvester Company, a corporation of New Jersey Original application April 20, 1933, Serial No. 666,971. Divided and this application March 13, 1936, Serial No. 68,786

6 Claims. (Cl. 130—5)

This invention relates to a corn husker, and in particular to a combined ear straightening and trash clearing mechanism. This application is a division of application Serial No. 666,971, filed April 20, 1933.

A principal object of the invention is to provide an improved construction in which a unitary mechanism functions to straighten and position the ears to be husked and to clear the trash which accumulates above the husking rolls.

A further object is to provide a positive forwarding means in combination with a combined ear retarder and straightening means.

These and other objects are obtained by a construction and arrangement of parts such as shown in the two forms of my device shown in the drawings, in which:

Figure 2 is a plan view of the husking unit shown in Figure 1 with the top plate and delivery chute removed in order to better show the construction of the ear forwarding and trash clearing means; and, Figure 3 is a section taken on the line 3—3 of Figure 2.

Figure 1:
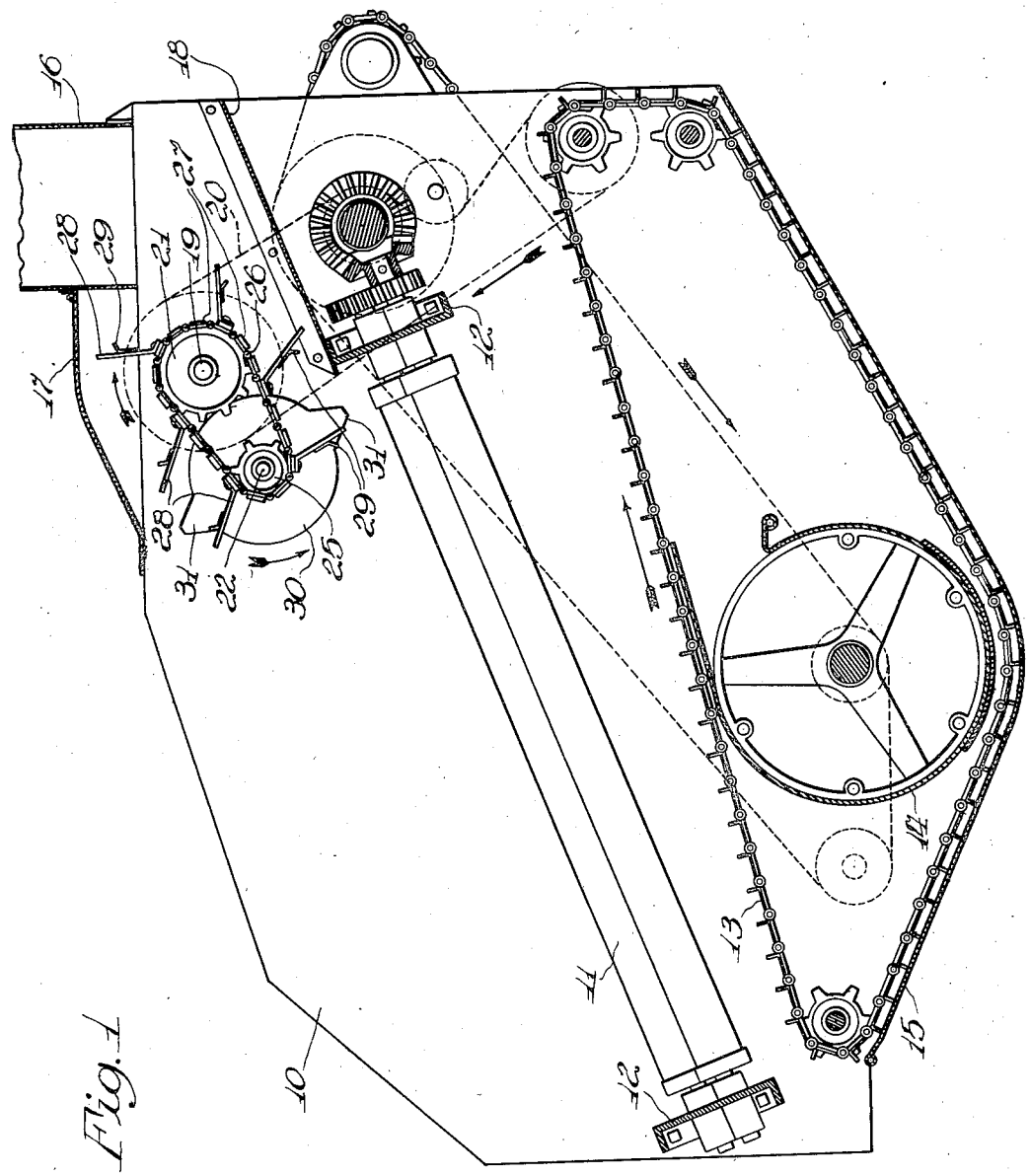
Figure 1 is a sectional view taken vertically through a husker unit of a conventional construction, in which a construction embodying the invention has been incorporated.

The husking unit, as shown in Figures 1, 2 and 3, is of a conventional construction, such as shown in the United States Patent No. 1,734,391. These huskers are usually made a part of the traveling corn picker, as shown in said patent. The husking unit consists essentially of a casing or housing 10 in which the husking rolls 11 are mounted at the proper angle of inclination. As illustrated, the husking rolls 11 are rotatably mounted in bearings supported by transverse members 12 supported on the housing. Suitable gearing and driving chains of a conventional construction are provided for driving the husking rolls in the proper direction at the proper speed. As shown in Figure 1, a conveyer chain 13, mounted below the husking rolls, cooperates with a fan contained in a housing 14 and a plate 15, to recover such shelled grain as may drop through the husking rolls and to deliver the husks outwardly at the rear end of the husking unit.

At the upper side of the housing 10 and at the end of the higher portions of the husking rolls 11, a delivery chute 16 communicates with the top of the housing. A cover plate 17 joins the chute 16 and extends over a portion of the top of the housing 10. Below the delivery end of the chute 16 an inclined plate 18, extending transversely across the housing 10, rests on the upper member 12 and terminates adjacent the top ends of the husking rolls 11.

A shaft 19, extending transversely across the housing 10, rotatably mounted in bearings carried by the side walls of said housing, is spaced substantially vertically above the top ends of the husking rolls and the lower end of the inclined plate 18. A driving chain 20, which also serves to drive the other mechanism of the husking unit, passes around a sprocket wheel mounted on the shaft 19 and continuously drives said shaft during operation of the husking unit.

A plurality of spaced sprocket wheels 21, four in number, as illustrated, are secured to the shaft 19 for rotation therewith. A second shaft 22, transversely extending across the casing 10, spaced forwardly and downwardly from the shaft 21, is rotatably mounted in suitable bearings carried by the side walls of the housing. Said shaft is driven by a gear 23 mounted thereon, which is in mesh with a gear 24 mounted on the shaft 19. A plurality of sprockets 25, smaller in diameter than the sprockets 21, are rotatably mounted on the shaft 22 in alignment with the sprockets 21. A chain 26 extends over each corresponding set of the sprockets 21 and 25.

A plurality of conveyer slats 27 are mounted on each of the chains 26. Each third conveyer slat carries a resilient flap or paddle 28, on which is mounted a small drag member 29. The flaps 28 in a normal position are at a slight rearward angle on the lower run of the chain, as best shown in Figure 1, and are of a length such that they will contact with the lower end of the plate 18 when no obstruction, such as ears of corn or trash, is encountered.

At each end of the shaft 22 and between each of the sprockets 25, an ear retarding and straightening element 30 is rigidly secured to the shaft 22. Each of these elements consists of a substantially circular flat plate which is provided at diametrically opposite points with projecting lugs 31. These lugs are of such a length and the diameter of the circular portion of the element is such that, when mounted on the shaft 22, the lugs, in their path of rotation, are spaced a short distance above the top of the husking rolls and pass closely to the end of the plate 18. It will be understood that with the direct engagement of the gears 23 and 24, the shaft 22 will be driven in a direction opposite to the direction of rotation of the shaft 19. This construction causes the portions of the ear straightening elements 30 adjacent the husking rolls to move in an upward direction while the flaps or paddles 28 are moving in a downward direction. The ears and trash, which are delivered to the plate 18, are resiliently engaged by the flaps 28 and carried over the end of the plate 18 to the husking rolls. At the same time the elements 30 are acting by means of the lugs 31 to engage the ears, which are lying crosswise, and to straighten the ears to a position substantially parallel to the husking rolls. It will be understood that the elements 30 are positioned a distance apart somewhat greater than the maximum diameter of the ears to be husked. It is practicably impossible for an ear to pass on to the husking rolls until it is in a position parallel thereto. This assures an immediate engagement of the husking rolls with the husk of the ears, thereby improving the operation of the husking unit by insuring the maximum utility of the upper portions of the rolls.

It is to be understood that although applicant has shown and described only two embodiments of his improved ear straightening and trash clearing device, he claims as his invention all modifications falling within the scope of the appended claims.

What is claimed is:

1. In a corn husking machine, and in combination, a casing, a plurality of downwardly inclined husking rolls mounted therein, means for delivering corn to be husked to the upper ends of said rolls, a transverse support rotatably mounted above the upper ends of said rolls, a second transverse support rotatably mounted in spaced relation to the first mentioned support, a plurality of spaced belts encircling said supports, rows of flexible elements secured to said belts and extending downwardly therefrom, a plurality of agitating elements mounted on one of the supports between said belts, and means for rotating one of said supports.

2. In a corn husking machine, and in combination, a casing, a plurality of downwardly inclined husking rolls mounted therein, means for delivering corn to be husked to the upper ends of said rolls, a transverse support rotatably mounted above the upper ends of said rolls, a transverse shaft rotatably mounted in spaced relation to the first mentioned support, a plurality of spaced sprockets rotatably mounted on said shaft, a plurality of spaced belts encircling said support and mounted on said sprockets, rows of flexible elements secured to said belts and extending downwardly therefrom, a plurality of agitating elements mounted on the shaft between said belts for rotation therewith, and means for rotating said support and said shaft in opposite directions.

3. In a corn husking machine, and in combination, a casing, a plurality of downwardly inclined husking rolls mounted therein, means for delivering corn to be husked to the upper ends of said rolls, a transverse support rotatably mounted above the upper ends of said rolls, a second transverse support rotatably mounted in spaced relation to the first mentioned support, a plurality of spaced belts encircling said supports, rows of flexible elements secured to said belts and extending downwardly therefrom, a plurality of agitating elements mounted on one of the supports between said belts, said agitating elements being formed as disks having circumferentially spaced extensions formed thereon, and means for rotating one of said supports.

4. In a corn husking machine, and in combination, a casing, a plurality of downwardly inclined husking rolls mounted therein, means for delivering corn to be husked to the upper ends of said rolls, a transverse support rotatably mounted above the upper ends of said rolls, a second transverse support rotatably mounted in spaced relation to the first mentioned support, a plurality of spaced belts encircling said supports, rows of flexible elements secured to said belts and extending downwardly therefrom, a plurality of agitating elements mounted on one of the supports between said belts, said agitating elements being formed as disks having circumferentially spaced extensions formed thereon, and driving means operable to rotate the belts and the agitating disks in opposite directions.

5. In a corn husking machine, and in combination therewith, a housing, a plurality of husking rolls mounted in said housing, means for driving said rolls, means for delivering corn to be husked to the casing adjacent one set of the ends of said rolls, a transverse shaft rotatably mounted above said ends, a plurality of transversely spaced, flexible elements carried by said support and extending outwardly therefrom toward the husking rolls, a second rotatable shaft, agitating and ear straightening elements mounted on said shaft and extending between the flexible elements, and means for rotating said shafts in opposite angular directions.

6. In a corn husking machine and in combination therewith a housing, a plurality of spaced sets of husking rolls mounted in said housing, means for driving said rolls, means for delivering corn to be husked to the casing at one end of the rolls, a transverse shaft rotatably mounted above said ends, a plurality of ear straightening elements mounted for rotation with said shaft, said elements being spaced axially of the shaft with one element over each set of rolls, means for driving said shaft with the periphery of the ear straightening elements moving in a direction opposite to the movement of the ears along the husking rolls, a second shaft spaced above the husking rolls and spaced from the first shaft, a plurality of driving sprockets fixed to said shaft and spaced axially thereof, a plurality of supports rotatably mounted on the first shaft between the ear straightening elements, said supports being in alignment with the sprockets on the second shaft, a plurality of belts surrounding the sprockets and the corresponding supports, said belts carrying flexible elements extending toward the husking rolls and means for driving the second shaft in a direction to carry the portions of the belts adjacent the husking rolls in the same direction of the travel of the ears therealong.

REX B. HITCHCOCK.